United States Patent
Yang et al.

(10) Patent No.: US 10,785,609 B2
(45) Date of Patent: Sep. 22, 2020

(54) METHOD AND TALKGROUP SERVER FOR EXTENDING THE BATTERY LIFE IN A SUBSCRIBER UNIT

(71) Applicant: MOTOROLA SOLUTIONS, INC, Chicago, IL (US)

(72) Inventors: Yunhai Yang, Elgin, IL (US); Daniel J. McDonald, Cary, IL (US); Joseph Namm, Plantation, FL (US); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 55 days.

(21) Appl. No.: 16/227,431

(22) Filed: Dec. 20, 2018

(65) Prior Publication Data

US 2020/0204959 A1    Jun. 25, 2020

(51) Int. Cl.
| | |
|---|---|
| *H04W 4/08* | (2009.01) |
| *H04W 56/00* | (2009.01) |
| *H04B 17/318* | (2015.01) |
| *H04W 72/14* | (2009.01) |
| *H04W 24/08* | (2009.01) |
| *H04L 12/703* | (2013.01) |
| *H04L 12/18* | (2006.01) |
| *H04L 12/24* | (2006.01) |
| *H04W 24/04* | (2009.01) |

(52) U.S. Cl.
CPC ............ *H04W 4/08* (2013.01); *H04B 17/318* (2015.01); *H04W 24/08* (2013.01); *H04W 56/001* (2013.01); *H04W 56/003* (2013.01); *H04W 72/14* (2013.01); *H04L 12/185* (2013.01); *H04L 12/1854* (2013.01); *H04L 41/0668* (2013.01); *H04L 45/28* (2013.01); *H04W 24/04* (2013.01)

(58) Field of Classification Search
CPC ..... H04W 4/08; H04W 56/001; H04W 72/14; H04W 56/003; H04W 24/08; H04W 24/04; H04B 17/318; H04L 41/0668; H04L 12/1854; H04L 45/28; H04L 12/185

See application file for complete search history.

(56) References Cited

U.S. PATENT DOCUMENTS

| | | | | |
|---|---|---|---|---|
| 10,455,373 | B2* | 10/2019 | Tillet | H04W 76/45 |
| 10,512,052 | B2* | 12/2019 | Shamir | H04W 56/001 |
| 2006/0252443 | A1 | 11/2006 | Sammour et al. | |
| 2011/0161697 | A1 | 6/2011 | Qi et al. | |
| 2012/0158981 | A1 | 6/2012 | Desai et al. | |
| 2013/0235773 | A1 | 9/2013 | Wan et al. | |
| 2015/0245287 | A1* | 8/2015 | Shudark | H04W 52/0206 370/311 |
| 2016/0020913 | A1 | 1/2016 | Kim et al. | |
| 2018/0220329 | A1* | 8/2018 | Arumugam | H04W 12/06 |
| 2018/0234918 | A1* | 8/2018 | Asterjadhi | H04W 52/0216 |

\* cited by examiner

Primary Examiner — Brian T O Connor

(57) ABSTRACT

A method and talkgroup server for extending a battery life in a subscriber unit is provided. A time sync at a triple TSBK boundary is maintained, the triple TSBK boundary being associated with a talkgroup. The triple TSBK window is calculated based on the time sync and configuration data. A talkgroup call request is granted for the talkgroup using a talkgroup call grant. A first transmission of the talkgroup call grant is targeted in the triple TSBK window associated with the talkgroup.

20 Claims, 3 Drawing Sheets

METHOD AND TALKGROUP SERVER FOR EXTENDING THE BATTERY LIFE IN A SUBSCRIBER UNIT

BACKGROUND OF THE INVENTION

For public safety users, unpredictable incidents can demand long battery life. Customer data shows that the majority of the battery power consumption for a subscriber unit (SU) is due to monitoring the outbound control channel for potential services. This is especially true since the outbound control channel transmits continuously. Therefore optimizing battery power saving during no activity and low activity periods becomes more important.

Typical land mobile radio control channels allow for group call grants to be transmitted at any time. This is due to the assumption that the radio is always monitoring the downlink control channel. The control channel is commonly formatted into three blocks of TSBK (Trunking Signaling Block) messages.

Therefore, an SU has to monitor the control channel continuously in order to ensure that a call grant is not missed. This continuous monitoring, in turn, consumes a significant amount of battery power and decreases the useful operating time of an SU between charging.

Therefore, a need exists to provide a method for ensuring that an SU receives, while minimizing truncation and delay issues, all call grants transmitted by the control channel it is monitoring while not providing excessive drain on the battery of the SU.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
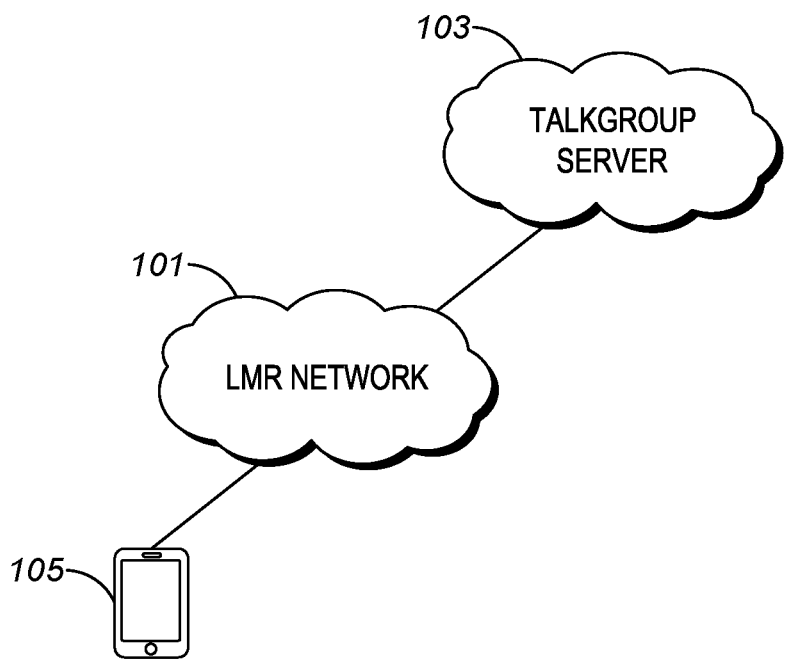
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment provides battery saving for subscriber units who are members of talkgroups. In an exemplary embodiment, each talkgroup is configured such that highly active subscriber units, which would be scanning the control channel often, stay awake. Highly inactive subscriber units are put in sleep mode for extended periods of time, thereby extending the battery life for that subscriber unit. The activity level of a subscriber unit is preferably determined using the current talkgroup and also past historical activity.

In accordance with an exemplary embodiment, the sleep/wakeup cycle is synchronized between subscriber units and infrastructure equipment. Each talkgroup's members preferably have their sleep/wakeup cycle synchronized based on the dynamically affiliated talkgroup ID and serving class of the talkgroup. In addition, the traffic load among outbound transmission opportunities is preferably balanced for all talkgroup IDs and their corresponding serving class.

In addition, an exemplary embodiment provides exception handling to allow for "full" triple TSBK blocks when the system gets heavily loaded.

FIG. 1 depicts a system diagram of a communication system 100 in accordance with an exemplary embodiment of the present invention. Communication system 100 preferably includes a land mobile radio (LMR) network 101, a talkgroup server 103, and a subscriber unit 105. In this embodiment, communication device 105 is connected to LMR network 101.

LMR Network 101 is a person-to-person voice communication system that includes two-way radio transceivers which can be mobile, installed in vehicles, or portable. LMR Network 101 is of a type that is commonly used by public safety personnel, such as police, fire, and ambulance services, and other governmental organizations. LIVIR Network 101 includes various network elements that assist in facilitating communication, such as base stations and controllers, but they are not shown for clarity purposes.

Figure 2:
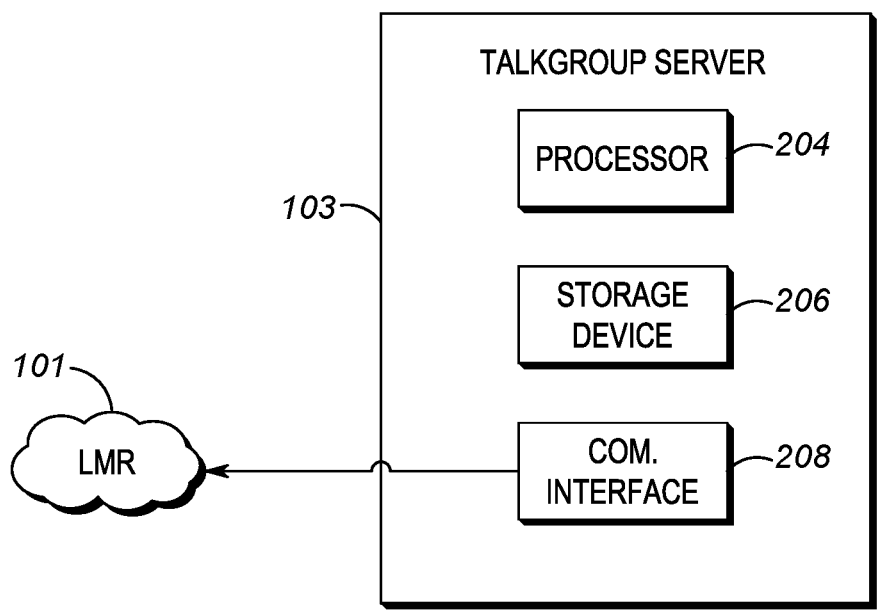
FIG. 2 depicts a Talkgroup Server in accordance with an exemplary embodiment of the present invention.

Talkgroup server 103, described more particularly below with respect to FIG. 2, is communicatively coupled to LMR Network 101. Talkgroup Server 103 is depicted as a separate network element, but can also be included within LMT Network 101. Talkgroup Server 103 processes talkgroup calls within communication system 100.

Subscriber Unit 105 is a mobile radio that can communicate with LMR Network 101. Subscriber units are sometimes referred to as mobile units, mobile devices, or mobile radios. In a typical communication system, there are dozens or even hundreds of subscriber units, but only one, Subscriber Unit 105, is depicted for clarity Subscriber Unit 105 preferably includes a transceiver, one or more processors, and memory. In an exemplary embodiment, Subscriber Unit 105 is a member of at least one talkgroup.

FIG. 2 schematically illustrates Talkgroup Server 103 in more detail. In the example provided, Talkgroup Server 103 includes an electronic processor 204, a storage device 206, and a communication interface 208. Electronic processor 204, storage device 206, and communication interface 208 communicate over one or more communication lines or buses. Wireless connections or a combination of wired and wireless connections are also possible.

Electronic processor 204 may include a microprocessor, application-specific integrated circuit (ASIC), field-programmable gate array, or another suitable electronic device. Electronic processor 204 obtains and provides information (for example, from storage device 206 and/or communication interface 208), and processes the information by executing one or more software instructions or modules, capable of being stored, for example, in a random access memory ("RAM") area of storage device 206 or a read only memory ("ROM") of storage device 206 or another non-transitory computer readable medium (not shown). The software can include firmware, one or more applications, program data, filters, rules, one or more program modules, and other executable instructions. Electronic processor 204 is configured to retrieve from storage device 206 and execute, among other things, software related to the control processes and methods described herein.

Storage device 206 can include one or more non-transitory computer-readable media, and may include a program storage area and a data storage area. The program storage area and the data storage area can include combinations of different types of memory, as described herein. In the embodiment illustrated, storage device 206 stores, among other things, instructions for the processor to carry out the methods of FIG. 3-5.

Communication interface 208 may include a transceiver (for example, a Wi-Fi or Ethernet transceiver) for communicating over one or more wired or wireless communication networks (for example, the land mobile radio (LMR) network 101) or connections.

Figure 3:
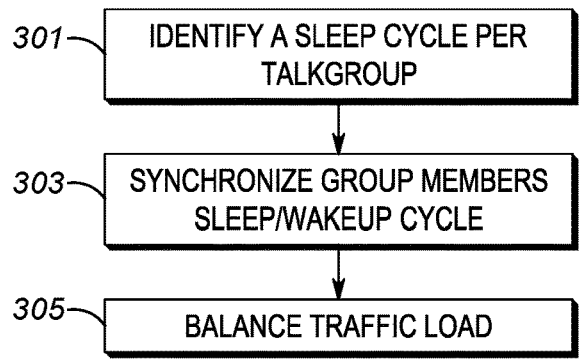
FIG. 3 depicts a flowchart in accordance with an exemplary embodiment of the present invention.

FIG. 3 depicts a flowchart 300 in accordance with an exemplary embodiment of the present invention. The exemplary embodiment depicted in FIG. 3 synchronizes devices and infrastructure for sleep/wakeup cycle of subscriber units in order to provide battery savings for the SU.

Talkgroup Server 103 identifies (301) a sleep cycle per talkgroup. The sleep cycle is preferably based on user patterns of members of the talkgroup. For example, a highly active talkgroup would be set to be awake at all times, while a highly inactive talkgroup would be set to sleep for a predetermined number of triple TSBKs.

Talkgroup Server 103 synchronizes (303) the sleep/wakeup cycle of the group members in the talkgroup. This is preferably based on the affiliated talkgroup ID (TGID), saving class, and Micro Slot or Triple TSBK boundary of the talkgroup.

Talkgroup Server 103 balances (305) the traffic load among outbound transmission opportunities. This reduces potential queuing delay for high priority messages, such as group call grants.

Figure 4:
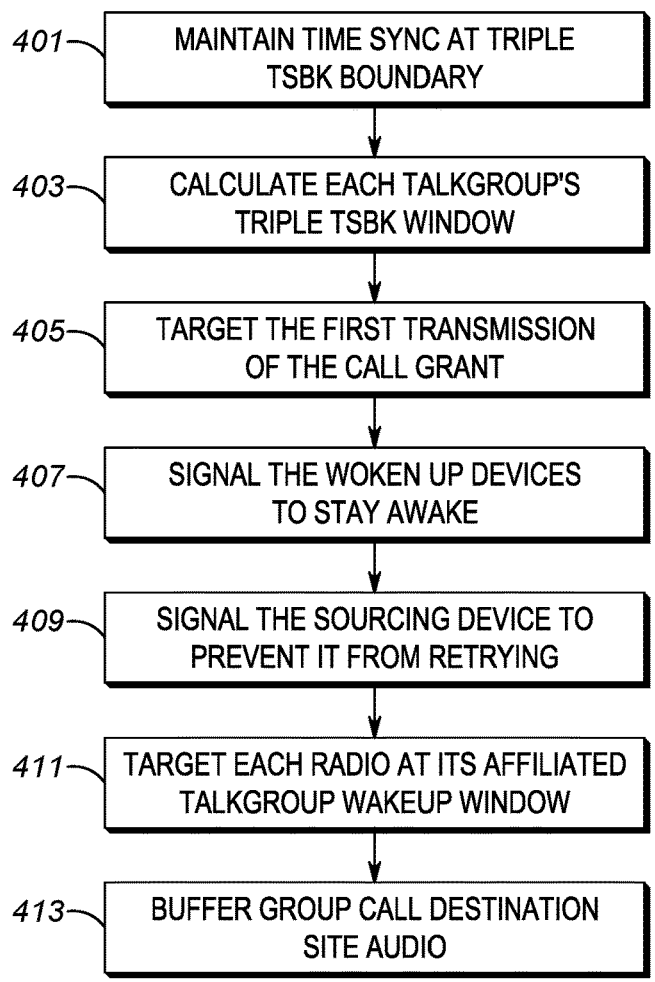
FIG. 4 depicts a flowchart of infrastructure processing in accordance with an exemplary embodiment of the present invention.

FIG. 4 depicts a flowchart 400 of infrastructure processing in accordance with an exemplary embodiment of the present invention.

Talkgroup Server 103 maintains (401) a time sync at a triple TSBK boundary within a duration. Alternately the boundary can be a microslot. In an exemplary embodiment, the duration is set to one minute.

Talkgroup Server 103 calculates (403) the triple TSBK window of each talkgroup. The triple TSBK window determines where in the control channel stream call grants for a particular talkgroup should be sent. When sent in the triple TSBK window for the talkgroup, each radio in the talkgroup can receive the call grant.

Upon granting a call, Talkgroup Server 103 targets (405) the first transmission of the call grant in the wakeup window of the talkgroup. In accordance with an exemplary embodiment, for reliability purposes Talkgroup Server 103 repeats and updates the call grant in the subsequent triple TSBKs immediately after the wakeup window.

Talkgroup Server 103 signals (407) the woken up devices to stay awake. In an exemplary embodiment, when there is a burst of traffic for a specific talkgroup, for multiple talkgroups, or for individual services that align with the same triple TSBK window.

Talkgroup Server 103 signals (409) the sourcing device. This is preferably done using an FNE Ack, but can alternately be done via a call grant. Signaling the sourcing device preferably prevents the sourcing device from retrying to send the call request while waiting for the group wakeup window to receive the actual call grant. This applies to all talkgroup members.

Talkgroup Server 103 uses the Control Channel and targets (411) each radio at its affiliated talkgroup wakeup window for individual services. For example, the Control Channel inserts a message for a specific talkgroup member in the talkgroup wakeup window for a dynamic regroup message, or an inhibit message or individual private call page, registration query, group affiliation query, etc. Talkgroup Server 103 ensures that audio is not transmitted to receiving subscriber units prior to a delayed call grant being issued.

In accordance with an exemplary embodiment, Talkgroup Server 103 buffers (413) group call destination site audio while the call grant is waiting to be sent in the control channel queue. The wait is caused due to asynchronous timing between sites. For example, when a control channel signals a voice channel after grant transmission.

Figure 5:
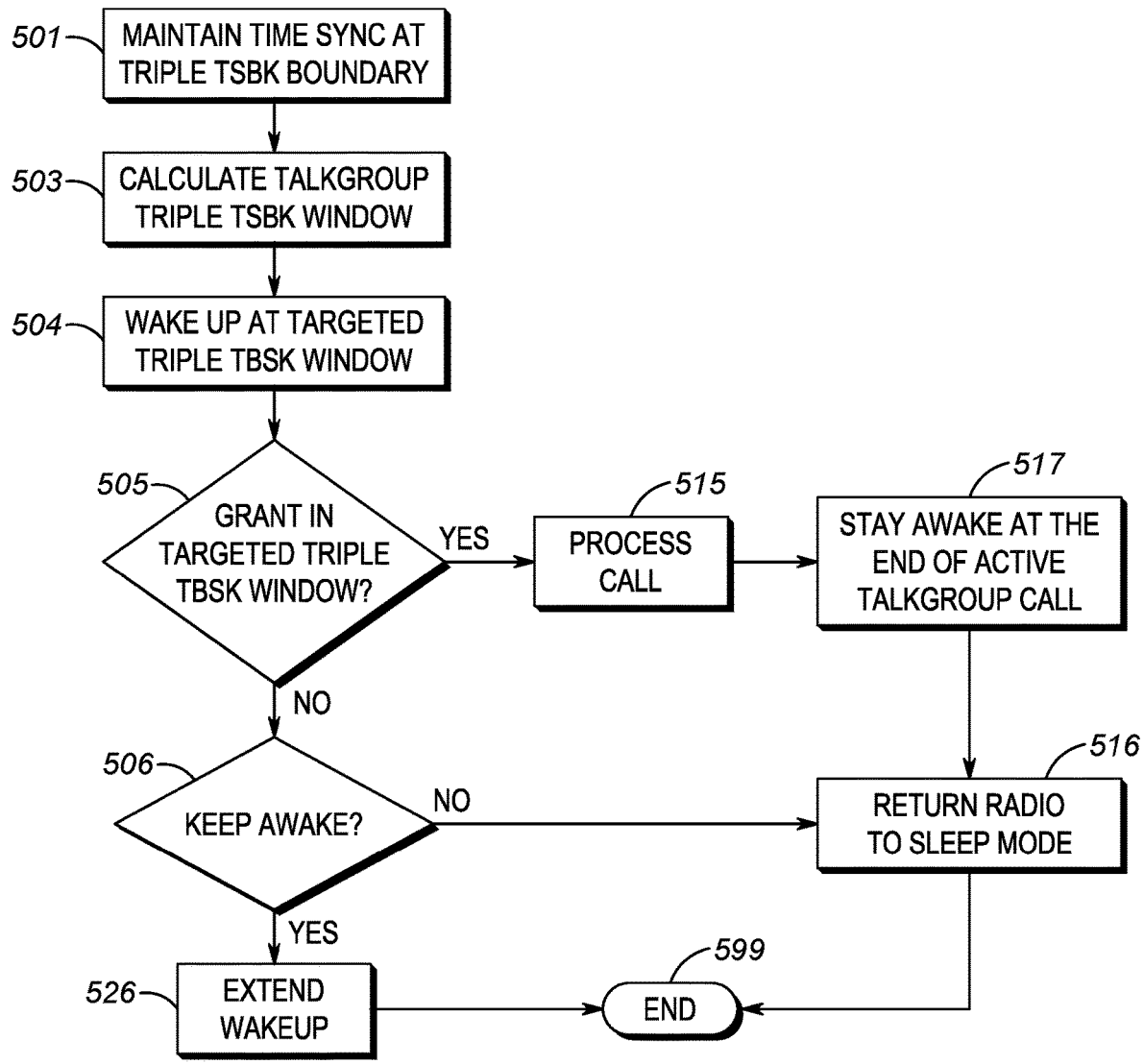
FIG. 5 depicts a flowchart of subscriber unit processing in accordance with an exemplary embodiment of the present invention.

FIG. 5 depicts a flowchart 500 of subscriber unit processing in accordance with an exemplary embodiment of the present invention.

Subscriber Unit 105 maintains (501) a time sync at a triple TSBK boundary within a duration. Alternately the boundary can be a microslot. In an exemplary embodiment, the duration is set to one minute.

Subscriber Unit 105 calculates (503) the triple TSBK window based on time sync and configuration. Subscriber unit 105 preferably awakens on every potential target triple TSBK window and sleeps during remaining time.

Subscriber Unit 105 wakes up (504) at the targeted triple TBSK window and receives the signal in the target triple TSBK window. In accordance with an exemplary embodiment, when Subscriber Unit 105 is a scanning radio, Subscriber Unit 105 wakes up for all scan talkgroups at each talkgroup's corresponding wakeup window. Further, Subscriber Unit 105 can wake up periodically and monitor the control channel from Scan Marker to Scan Marker to receive background activity, such as adjacent control channel information and potential enhanced data channels. In accordance with an exemplary embodiment, Subscriber Unit 105 dynamically adjusts the internal retry timers based on the relative time distance to the targeted wakeup window. Alternately, Subscriber Unit 105 the transmitting radio can be granted access immediately, but audio is buffered in Talkgroup Server 103 or a base station until the receiving radios receive the call grant. In an exemplary embodiment, Subscriber Unit 105 adjusts their RSSI sample window to not overlap with the target wakeup window. In the case when subscriber unit 105's request is for its own individual service rather than the group, the response can be sent right away by the infrastructure since subscriber unit 105 is awake and waiting for the response and no other radios are targeted receivers of that individual service response.

Subscriber Unit 105 determines (505) if there has been a call grant received in the targeted triple TBSK window. If so, then Subscriber Unit 105 processes (515) the call in the call grant. When the call ends, Subscriber Unit 105 stays (517) awake for a short time. This allows for optimization of the control channel grant transit delay for subsequent calls within a conversation for the same talkgroup. As used herein, a "conversation" is a group of calls that are related make up a single discussion. In additional to "call grant", there could be individual service requests targeted to the subscriber unit, such as an outbound data page. The subscriber unit preferably takes action accordingly, If a grant was not received as determined at step 505, Subscriber Unit 105 determines (506) if the subscriber unit should be kept awake. If not, the radio is returned (516) to sleep mode.

If Subscriber Unit 105 determines at step 506 that Subscriber Unit 105 should be kept awake, Subscriber Unit 105 extends (526) the awake window. In a first exemplary embodiment, the awake window is extended when Subscriber Unit 105 fails to decode the targeted triple TSBK. In a second exemplary embodiment, the awake window is extended when Subscriber Unit 105 sees three consecutive call grants that do not apply to Subscriber Unit 105. In a third exemplary embodiment, the awake window is extended when Subscriber Unit 105 receives a message telling Subscriber Unit 105 to stay awake. In a fourth exemplary embodiment, the awake window is extended when Subscriber Unit 105 fails.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method to extend a battery life in a subscriber unit, the method comprising:
   maintaining a time sync at a triple Trunking Signaling Block (TSBK) boundary, the triple TSBK boundary being associated with a talkgroup;
   calculating the triple TSBK window based on the time sync and configuration data;
   granting a talkgroup call request for the talkgroup using a talkgroup call grant; and targeting a first transmission of the talkgroup call grant in the triple TSBK window associated with the talkgroup.

2. The method of claim 1, wherein the step of maintaining a time sync at a triple TSBK boundary comprises maintaining a time sync at a microslot.

3. The method of claim 1, the method further comprising transmitting a burst of traffic for a specific talkgroup at the triple TSBK window.

4. The method of claim 1, the method further comprising buffering audio for a talkgroup call until the talkgroup call grant is transmitted on a control channel.

5. The method of claim 1, the method further comprising signaling a talkgroup member who sent the talkgroup call request to wait to resend the talkgroup call request until each member of the talkgroup has been sent the talkgroup call grant.

6. The method of claim 1, the method further comprising
maintaining a second time sync at a second triple TSBK boundary, the second triple TSBK boundary being associated with a second talkgroup;
calculating a second triple TSBK window based on the second time sync and second configuration data;
granting a second talkgroup call request for the second talkgroup using a second talkgroup call grant; and
targeting a first transmission of the second talkgroup call grant in the second triple TSBK window associated with the talkgroup, wherein the second triple TSBK window is offset from the triple TSBK window.

7. A method to extend a battery life in a subscriber unit, the method comprising:
maintaining a time sync at a triple Trunking Signaling Block (TSBK) boundary;
calculating at the subscriber unit the triple TSBK window based on the time sync and configuration data;
waking up the subscriber unit at the triple TSBK window;
receiving, at the subscriber unit, talkgroup data in the target triple TSBK window;
when the talkgroup data includes a talkgroup call grant intended for the subscriber unit, processing the talkgroup data at the mobile unit, and
when the talkgroup data does not include a talkgroup call grant intended for the subscriber unit, determining if the subscriber unit should be kept awake.

8. The method of claim 7, wherein the step of maintaining a time sync comprises maintaining a time sync at a microslot.

9. The method of claim 7, wherein the subscriber unit is a scanning radio, and wherein the subscriber unit is a member of multiple talkgroups, the method further comprising waking up the subscriber unit for each talkgroup's corresponding wakeup window.

10. The method of claim 7, the method further comprising:
waking up the subscriber unit at times in addition to the TSBK boundary; and
monitoring the control channel to receive background control channel activity.

11. The method of claim 10, wherein the step of monitoring the control channel comprises monitoring the control channel from a first scan marker to second scan marker.

12. The method of claim 7, wherein the step of waking up the subscriber unit comprises dynamically adjusting an internal retry timer, wherein the length of the internal retry timer is based on the relative time distance to the triple TSBK window.

13. The method of claim 7, the method further comprising:
waking up the subscriber unit outside of the triple TSBK window ; and
buffering audio at a base station until the subscriber unit receives the triple TSBK window.

14. The method of claim 7, the method further comprising the step of adjusting a Radio Signal Strength Indicator (RSSI) sampling such that the RSSI sampling does not overlap with the triple TSBK window.

15. The method of claim 7, wherein when the talkgroup data does not include a talkgroup call grant intended for the subscriber unit and the subscriber unit is determined to be kept awake, the method further comprising extending the awake window.

16. The method of claim 15, wherein the awake window is extended when the subscriber unit fails to decode the targeted triple TSBK.

17. The method of claim 15, wherein the awake window is extended when the subscriber unit detects three consecutive call grants messages.

18. The method of claim 15, wherein the awake window is extended when the subscriber unit receives a stay awake message.

19. The method of claim 15, wherein the awake window is extended when the subscriber unit detects three consecutive high priority outbound signaling messages.

20. A Talkgroup Server comprising:
a communication interface; and
a processor that performs:
maintaining a time sync at a triple Trunking Signaling Block (TSBK) boundary, the triple TSBK boundary being associated with a talkgroup;
calculating the triple TSBK window based on the time sync and configuration data;
granting a talkgroup call request for the talkgroup using a talkgroup call grant; and
targeting a first transmission of the talkgroup call grant in the triple TSBK window associated with the talkgroup.

* * * * *